United States Patent
Hill

Patent Number: 5,678,793
Date of Patent: Oct. 21, 1997

[54] BRACKET FOR MOUNTING A HAND HOLDABLE APPLIANCE OR THE LIKE

[76] Inventor: Gregory Hill Hill, 8409 Petaluma Dr., Sun Valley, Calif. 91352

[21] Appl. No.: 550,594

[22] Filed: Oct. 30, 1995

[51] Int. Cl.⁶ ............................................................ A47G 1/17
[52] U.S. Cl. ........................ 248/206.3; 224/482; 248/309.3
[58] Field of Search .............................. 248/205.3, 309.1, 248/205.5, 311.2, 309.3; 224/556, 559, 482

[56] References Cited

U.S. PATENT DOCUMENTS

| | | | |
|---|---|---|---|
| 3,343,772 | 9/1967 | Howell et al. | 248/206.1 |
| 4,648,572 | 3/1987 | Sokol | 248/206.2 |
| 4,696,447 | 9/1987 | Strecker | 248/206.3 |
| 4,815,683 | 3/1989 | Ferrante | 248/309.1 X |
| 4,836,482 | 6/1989 | Sokol | 248/206.3 |
| 4,863,130 | 9/1989 | Marks, Jr. | 248/206.3 |
| 4,865,237 | 9/1989 | Allen | 224/482 X |
| 4,896,855 | 1/1990 | Furnish | 248/206.3 |
| 4,957,254 | 9/1990 | Hill et al. | 248/311.2 X |
| 4,984,760 | 1/1991 | Cohn et al. | 248/126 |
| 5,046,696 | 9/1991 | Lee | 248/309.1 |
| 5,246,193 | 9/1993 | Faidley | 248/206.3 |
| 5,529,271 | 6/1996 | Dunchock | 248/309.1 X |

*Primary Examiner*—Ramon O. Ramirez
*Attorney, Agent, or Firm*—Louis L. Dachs

[57] ABSTRACT

The invention is a mounting bracket for securing a portable hand holdable appliance to a window extending vertically from a window sill. In detail, the bracket includes a plate having first and second side and top, bottom and side edges, and additionally, an attachment device to mount the appliance. A pair of suction cups are mounted on the first side of the plate horizontally spaced from each other in proximity to the top thereof. The bottom portion of the plate extends from the plane of the plate at an acute angle outwardly from the first side and terminates in a pointed edge. Thus the bracket can be secured to the surface by wedging the pointed edge between the window and sill and rotated thereabout so that the suction cups engage the window.

9 Claims, 2 Drawing Sheets

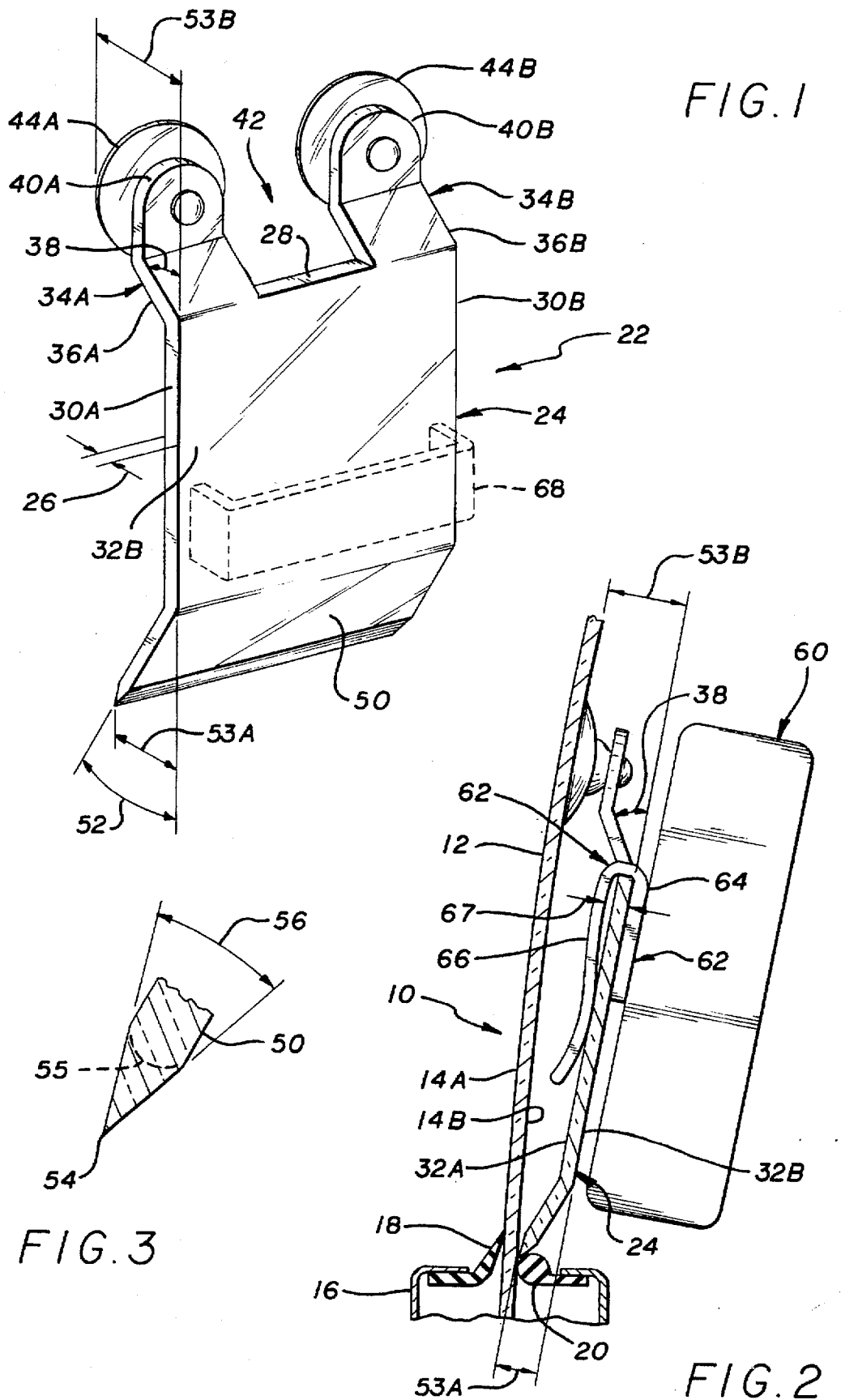

BRACKET FOR MOUNTING A HAND HOLDABLE APPLIANCE OR THE LIKE

BACKGROUND OF THE INVENTION

1. Field of the Invention

The invention relates to the field of removable brackets for the support of hand holdable appliances such as portable radios, tape players and the like to a vertical surface and, in particular, to a bracket that is mountable to a window of an automobile.

2. Description of Related Art

While most vehicles, such as automobiles, have built in radios, tape players and laser disc players, most do not incorporate all three. Thus if an automobile incorporates only a radio, the driver typically caries a portable hand held tape player. Because of the lack of convenient surfaces with in the passenger compartment, the driver must just place the recorder on the passenger seat, dash board or center consul. In most cases this is far from satisfactory. If placed on the passenger seat, it is to far away to easily hear. Ear phones can be used, but are not generally comfortable to wear for long periods. In addition, in most states it is illegal to wear ear phones because of great difficulty in hearing the sirens of emergency vehicles or the horns of other care. If placed on the dash board, it easily falls off when the car hits a bump in the read or when the auto goes around a corner. Of course, one can install permanent mounting supports for such devices within the passenger compartment, but these, typically, are unsightly and reduce the value of the automobile. One answer is to mount the appliance to the windows of the auto by means of vacuum cups. For example, in U.S. Pat. No. 3,343,772 "Attachment Device For Small Appliances" T. G. Howell, et al a bracket is mounted at its top end by a single suction cup to the side window next to the driver. The bracket includes a bottom lip upon which the portable appliance is mounted. A wire spring retainer is used to hold the appliance in place. The problem with this device is that the bracket is allowed to freely spring about the suction cup. In fact, it incorporates a rubber strip on the bottom of the bracket on the side opposite the lip so that if the bracket does pivot when the car hits a bump in the road, the rubber strip absorbs the force as the bottom of the bracket hits the window. With the suction cup absorbing the total weight of the bracket and appliance, which are free to swing back and forth, it is unlikely that the suction cup will remain secured to the window for any length of time.

In U. S. Pat. No. 4,984,760 "Dual-Use Holder For Pocket-Sized Electronic Appliance Or The Like" by A. K. Cohn, et al. a sum what similar device is disclosed. Here a plate having a lip at the top end thereof is securable to the window by a suction cup. A L shaped mounting appliance holder incorporates a slot with engages the lip of the plate. The appliance mounted on the L shaped holder and is secured thereto by a strap. In a second embodiment, the hold incorporates a receptacle in which the appliance is mounted. Here, as in the previous example, the plate/holder/appliance assembly is free to pivot about the suction cup, and it is possible that the cup suction will be lost. In addition, the use of a receptacle to mount the appliance limits the number that can be accommodated.

U.S. Pat. No. 4,863,130 "Adjustable Device For Mounting An Electronic imaging Camera To A Surface By Vacuum" by F. J. Marks, Jr.,. U.S. Pat. No. 4,836,482 "Hinged Support Bracket for A Radar Detector Or Like Device" by S. Sokol, U.S. Pat. No. 4,648,572 "Bracket For Supporting A radar Detector Or Like Device" by S. Sokol, U. S. Pat. No. Re. 34,120 "Article Holding Device" by K. C. Plahn, and U. S. Pat. No. 5,246,193 "Mobile Camera Mount" by W. E. Faidley U.S. Pat. No. 4,869,855 "Pivotal Windshield Mount" by G. furnish all disclose mounting devices for radar detectors or video cameras to the front windshield of the an automobile. All these device also use suction cups to mount to the windshield, however, they all are designed to mount the detectors/video cameras horizontally.

Furthermore, none of the prior art devises take advantage of the fact that almost all these hand held appliances incorporate belt clips so that they can be hung therefrom when the user walks are runs, etc. For example, the Sony Corporation Walkman™ portable tape player/radio. These belt clips are either attached by screws or clip on the back of the appliance and are almost the same size and shape.

Thus, it is a primary object of the invention to provide a bracket for mounting a hand holdable appliance or the like to a window of a vehicle.

It is another primary object of the invention to provide a bracket for mounting a hand holdable appliance or the like to a window of a vehicle wherein the appliance is mounted thereto by a belt clip.

It is a further object of the invention to provide a bracket for mounting a hand holdable appliance or the like to a window of a vehicle having means to dampen movement of the bracket due to vehicle vibrations.

SUMMARY OF THE INVENTION

The invention is a mounting bracket for securing a portable hand holdable appliance to a window extending vertically from a window sill. Generally, the bracket includes a plate having first and second side and top, bottom and side edges, and additionally, an attachment device to mount the appliance. A pair of suction cups are mounted on the first side of the plate horizontally spaced from each other in proximity to the top thereof. The bottom portion of the plate extends outward and downward from the plane of the plate at an acute angle from the first side and terminates in a pointed edge.

Such a bracket can be secured to a mounting surface, such as the side window of an automobile by placing the pointed edge of the bottom portion of the plate between the window and the sill and, thereafter rotating the plate so that the suction cups engage the window. The appliance is mounted on the plate by inserting the belt clip over the top edge of the plate on the notch. The weight of the appliance causes a torque to be applied about the suction cups, which in turn causes the plate to rotate toward the window. This drives the bevel edge further into the "gap" between the window and sill such that the load is absorbed.

In one embodiment, the bracket is adapted for securing a portable hand held electronic appliance having a belt clip attached thereto to a window of an automobile. In detail, the top edge of the plate is adapted to engage the belt clip of the appliance. Preferably, the top of the plate includes a notch having a width greater than the width of the belt clip, and the suction cups are mounted on the portions of the plate on either side of the notch. Preferably, the portions of the plate on either side of the notch have a first segment extending upward and inward at an acute angle to the plane of the plate and a second segment extending upward in a plane parallel to the plane of the plate from the first segment; with the suction cups mounted on the second segments.

In a second embodiment, an appliance holder is mounted on the second side of the plate. This holder can be rectangular in shape for supporting hand holdable tape recorders or radios. Alternatively, the holder can be round in shape to support a bottle of water or a beverage can.

The preferred acute angle for the first second segments is 60 degrees. The preferable acute angle of bottom portion of the plate is generally 20 degrees. Preferably the pointed edge has an included angle of around 35 degrees. Finally the distance between the end of the suction cups and the plane of the plate is equal to the distance of the knife edge from the plane of the plate.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a perspective view of a first preferred embodiment of the bracket.

FIG. 2 is a cross-sectional view of the first embodiment mounted to the window of a car door.

FIG. 3 is a enlarged portion of FIG. 2 illustrating the bottom portion of the bracket.

DESCRIPTION OF THE PREFERRED EMBODIMENT

Figure 4:
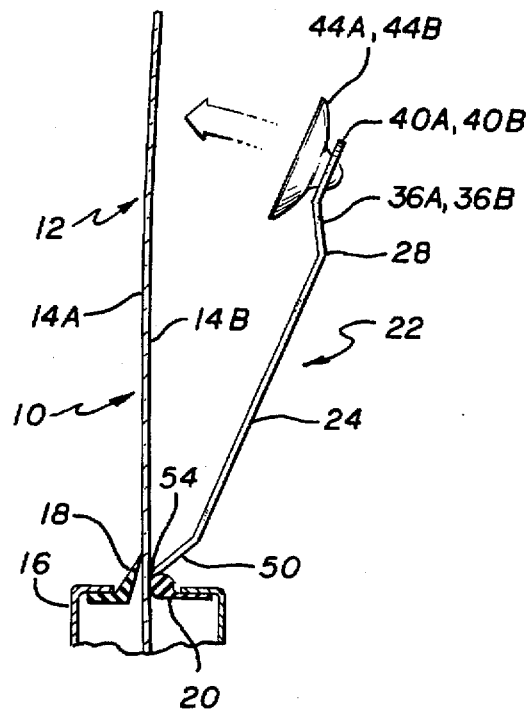
FIG. 4 is a partial side view of the car door and window illustrating the installation of the bracket.

Presented in FIGS. 1–3 is a partial cross-sectional view of an automobile door, generally indicated by numeral 10. The door 10 includes a window 12, having an inside and outside surfaces 14A and 14B, extending out of a door sill 16. The door sill 16 typically includes a moisture seal 18 in contact with the outside surface 14A and a bead type dust seal 20 in contact with the inside surface 14B. The subject bracket, generally indicated by numeral 22, is shown mounted to the inside surface 14B of the window 12.

The bracket 22 includes a ridged plate 24 having a thickness 26, top edge 28, side edges 30A and 30B, and first and second principle sides 32A and 32B. The plate 24 further includes a pair of tabs 34A and 34B having first portions 36A and 36B that extend from the top edge 28 upward and outward from the first principle side 32A at an angle 38 that is preferably 30 degrees to the plane of the plate 24 and second portions 40A and 40B that are rotated back in a plane parallel with the plane of the plate 24. The tabs 34A and 34B in combination with the top edge 28 form a notch 42. A pair of suction cups 44A and 44B are mounted to the second portions 40A and 40B for attaching the plate 24 to the inside surface 14B of the window 12.

The bottom portion 50 of the plate 24 is angled downward and away from the second principle side 32B at an angle 52 that is preferable about 20 degrees from the plane of the plate 24 for a distance 53A. Although not shown as such, it is desirable that the distance 53A be about equal to the, distance from the plane of the plate to the end of the suction cups 44A and 44B, indicated by numeral 53B. The bottom edge 54 of the plate 24 has a pointed edge with an included angle 56 that is preferably about 35 degrees. Of course, as illustrated in FIG. 3, in some instances, a more rounded bottom edge, indicated in dotted lines and numeral 55, can be used if the design of the dust seal 20 permits or if it is intended that the edge rest against the sill.

The typical electronic appliance 60, such as a hand held portable radio, tape player, compact disc player, or a combination thereof, includes a detachable, generally U shaped belt clip 62. One leg 64 of the belt clip 62 is in detachable engagement with the appliance 60 and a second leg 66 that can be slid over the belt (not shown) so that a person can walk, jog or workout while listing to music or the like. The thickness 26 of the plate 24 should be no greater than the gap between the first and second legs 64 and 66, indicated by numeral 67.

Figure 5:
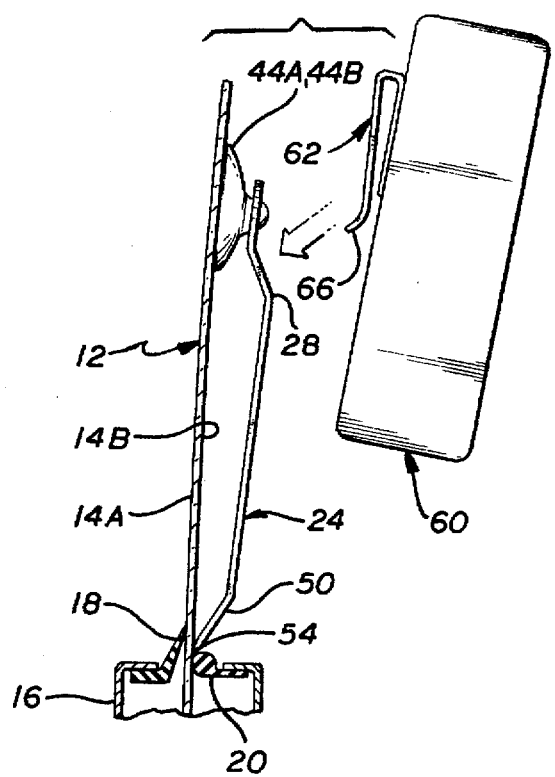
FIG. 5 is a view similar to FIG. 4 illustrating the installation of the electronic apparatus after the bracket has been installed.

Referring to FIGS. 4 and 5, the bracket 22 is mounted to the window side 14B of the window 12 by first wedging the bottom edge 54 between the side 14B of the window and the seal 20 of the door sill 16 of the door 10. Thereafter, the plate 24 is rotated toward the window 12 and the suction cups 44A and 44B are engaged with the window. Thereafter, the appliance 60 is mounted thereto by just sliding the second leg 66 of the belt clip 62 over the top edge 28 until the clip 62 seats there on. An alternate method off mounting the appliance 60 is to incorporate a holder or socket, shown in dotted lines and indicated by numeral 68, on the surface 14A; thus expanding the type of appliances that can be mounted on the bracket beyond those incorporating belt clips.

The advantages of the bracket 22 over the prior art are numerous. For example, by having the bottom edge 54 seat (wedged between the seal 20 and window 12, much firmer support is provide and the suction cups 40A and 40B are far less likely to come loose during normal driving of the automobile. Additionally, by having a notch 42 located between the two suction cups 40A and 40B, the load from the appliance 60 is equally distributed therebetween. Additionally, by use of tabs 34A and 34B that bend inward toward the window 12, the notch 42 is sufficiently separated from the suction cups 40A and 40B so that, when mounting the appliance 60, there is little likelihood that the appliance will strike the suction cups causing them to dislodge.

Figure 6:
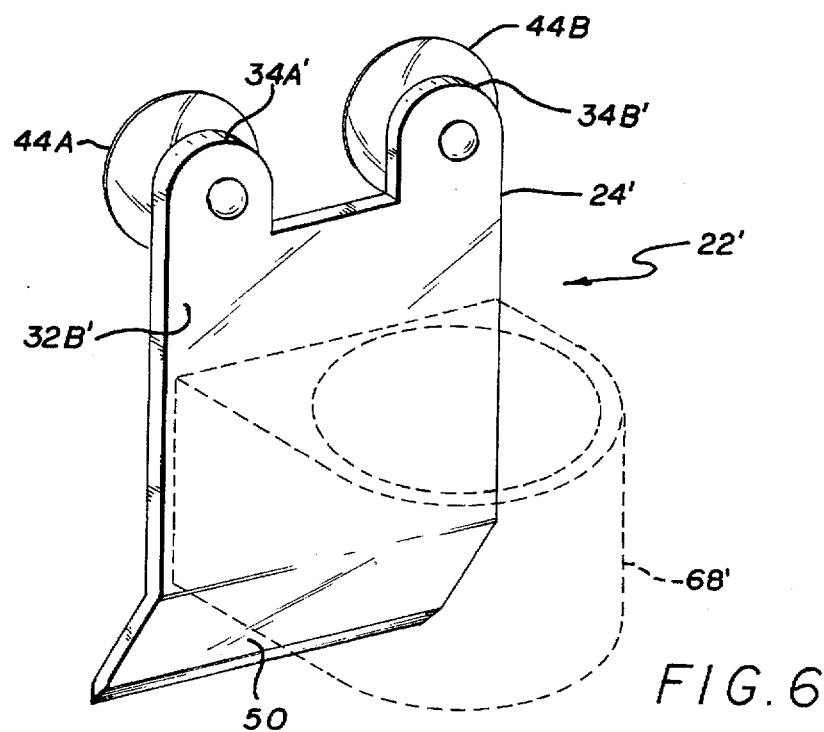
FIG. 6 is perspective view of a second embodiment of the bracket.

Illustrated in FIG. 6 is an alternate embodiment of the bracket, indicated by numeral 22' wherein the tabs 34A' and 34B' extend only vertically in the plane of the plate 14'. All other features are identical and are indicated by identical numerals. This design while simpler will require that the greater care be taken in positioning the appliance because sense the notch is closer to the suction cups there is a greater change of hitting them when installing the appliance. Note again, plate 14' could also be modified to incorporate a round holder or socket, indicated in dotted lines and by numeral 68', that could be used to support a water bottle or beverage can (not shown).

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to automobile industry and the like, and, in particular, to the automobile after market accessory business.

I claim:

1. A mounting bracket for mounting a portable hand holdable appliance to a window extending vertically upward from a window sill, the appliance including a belt clip, said bracket comprising:

a plate having first and second sides and top, bottom and side edges, said bottom portion extending outwardly and downwardly from said first side, said top edge including a notch having a width greater than the width of the belt clip;

a pair of suction cups mounted on said first side of said plate in proximity to said top thereof and horizontally spaced from each other on the portions of said plate on either side of said notch, said pair of suction cups for mounting to the window; and said plate having a bottom portion terminating in an edge adapted to mount in the corner formed by the junction of the window and sill.

2. The bracket as set forth in claim 1 wherein said bottom edge of said plate includes a pointed edge.

3. The bracket as set forth in claim 2 wherein:

said portions of said plate on either side of said notch have a first segment extending inward at an acute angle to the plane of said plate and a second segment extending upward from said first segment in a plane parallel to said plane of said plate; and said suction cups mounted on said second segments.

4. The bracket as set forth in claim 3 wherein an appliance holder is mounted to said second side.

5. The bracket as set forth in claim 4 wherein the angle of said bottom portion to said plane of said plate is 20 degrees.

6. The bracket as set forth in claim 5 wherein the distance from the end of said suction cups to said plane of said plate is generally equal to the distance from the edge of said bottom edge to said plane of said plate.

7. The bracket as set forth in claim 6 wherein said spacing of said suction cups is greater than the width of the belt clip of the appliance.

8. The bracket as set forth in claim 7 wherein said bottom edge of said plate includes a pointed edge.

9. The bracket as set forth in claim 8 wherein said pointed edge has an included angle of about 35 degrees.

* * * * *